United States Patent
Yang et al.

(10) Patent No.: US 7,108,431 B2
(45) Date of Patent: Sep. 19, 2006

(54) FERRULE FOR USE IN FIBER OPTIC CONNECTORS

(75) Inventors: Lizhang Yang, Austin, TX (US); Larry R. Cox, Austin, TX (US); Harry A. Loder, Austin, TX (US); Edward B. Lurie, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 125 days.

(21) Appl. No.: 10/417,928

(22) Filed: Apr. 17, 2003

(65) Prior Publication Data

US 2004/0208456 A1    Oct. 21, 2004

(51) Int. Cl.
*G02B 6/36*    (2006.01)
(52) U.S. Cl. .................... 385/78; 385/83; 385/114
(58) Field of Classification Search .................. 385/78, 385/83, 86, 114
See application file for complete search history.

(56) References Cited

U.S. PATENT DOCUMENTS

| 4,265,514 | A |   | 5/1981 | Wellington et al. |  |
|---|---|---|---|---|---|
| 4,830,456 | A | * | 5/1989 | Kakii et al. | 385/75 |
| 5,446,815 | A | * | 8/1995 | Ota et al. | 385/33 |
| 5,519,799 | A | * | 5/1996 | Murakami et al. | 385/78 |
| 5,548,675 | A | * | 8/1996 | Shigematsu et al. | 385/80 |
| 5,815,621 | A | * | 9/1998 | Sakai et al. | 385/80 |
| 5,920,670 | A |   | 7/1999 | Lee et al. |  |
| 6,012,852 | A | * | 1/2000 | Kadar-Kallen et al. | 385/74 |
| 6,072,932 | A |   | 6/2000 | Bennett et al. |  |
| 6,409,394 | B1 |   | 6/2002 | Ueda et al. |  |
| 6,604,866 | B1 | * | 8/2003 | Kang et al. | 385/78 |
| 2001/0008571 | A1 | * | 7/2001 | Chivers | 385/75 |
| 2002/0168150 | A1 |   | 11/2002 | Shiino et al. |  |
| 2003/0016934 | A1 |   | 1/2003 | Sun et al. |  |
| 2004/0057671 | A1 | * | 3/2004 | Kang et al. | 385/71 |

FOREIGN PATENT DOCUMENTS

| EP | 0 659 701 A1 | 6/1995 |
|---|---|---|
| EP | 0 996 008 A2 | 4/2000 |
| EP | 1033594 | 9/2000 |
| EP | 1164395 | 12/2001 |
| EP | 1 223 445 A1 | 7/2002 |
| WO | WO 91/02273 | 2/1991 |

OTHER PUBLICATIONS

U.S. Application entitled "Apparatus Useful for Guiding Fiber Optic Ribbons Into Ferrules", filed Apr. 17, 2004, having U.S. Appl. No. 10/417,536.

* cited by examiner

*Primary Examiner*—Ellen E. Kim
(74) *Attorney, Agent, or Firm*—Gregg H. Rosenblatt; Melanie G. Gover

(57) ABSTRACT

This invention relates to a ferrule for use in a fiber optic connector. The ferrule has front and rear faces and comprises (a) a passage being disposed inside the ferrule and having first and second ends, the passage having dimensions defined by the following formulas:

$$(n*a) \leq H \leq (n+1)*a$$

$$X \leq W \leq X+b$$

where "W" is the passage width, "H" is the passage height, "X" is the measured with of a fiber optic ribbon, "n" is the number of fiber optic ribbons and n>1, "a" is the fiber optic ribbon thickness and "b" is the fiber pitch on a (b) a plurality of tapered channels disposed between the second end of the passage to said front face of the ferrule.

17 Claims, 2 Drawing Sheets

FERRULE FOR USE IN FIBER OPTIC CONNECTORS

CROSS REFERENCE OF RELATED APPLICATION

The present invention is related to U.S. patent application Ser. No. 10/417,536 filed even date herewith.

FIELD OF THE INVENTION

The present invention relates to a ferrule for use in an optical fiber connector. In particular, the present invention relates to a ferrule design that allows for efficient installation of multiple fiber optic ribbons.

BACKGROUND

Optical fiber connectors typically use a ferrule in which the optical fibers are terminated and secured. There are commercially available ferrules in the market, such as the MT ferrule, available from various suppliers such as US Conec, Inc. North Carolina; Furukawa America Corporation, Atlanta, Ga.; Sumitomo Electric, Japan; or Hakusan LTD, Japan. The MT ferrule can accommodate a variety of different numbers of optical fibers and fiber optic ribbons. For example, a MT 24 ferrule can accommodate up to 24 optical fibers. Usually the optical fibers are stacked in an array of two rows and twelve columns. As one skilled in the art readily knows, fiber optic ribbons (sometimes referred to herein simply as "ribbons" for convenience) are supplied with several individual fibers disposed parallel to one another, each individual optical fiber having a glass core, a glass cladding, both of which are being protected in a polymeric coating, which can be color coded. A plurality of these individual optical fibers are impregnated in a polymeric ribbon matrix to form a fiber optic ribbon. Currently, fiber optic ribbons are commercially supplied as 2-fiber ribbons, 4-fiber ribbons, 8-fiber ribbons, and 12-fiber ribbons.

Today, fiber optic connectors are being designed to handle higher numbers of optical fibers to provide for a larger number of optical communication channels. For example, while it is very common to have a fiber optic connector terminated with eight individual optical fibers, in some applications, it is more desirable to terminate a similar connector with 24, 32, 48, or even 60 optical fibers. When multiple fiber optic ribbons and their associated individual fibers are manually installed into a ferrule, the process can be very time consuming. One skilled in the art will appreciate the difficulty of manual installation given that a typical 8-fiber ribbon as supplied from Corning Cable Systems, LLC, Hickory, N.C. is about 2 mm wide and 0.32 mm thick, with each coated individual fiber being about 250 micrometer in diameter. As of the filing date, product information on the Corning fiber optic ribbons can be found at the www.corningcablesystems.com web site.

One common practice for installing multiple ribbons into a ferrule, such as a guiding ferrule, is to install one ribbon at a time. The 24-fiber, multiple ribbon MT ferrule has been designed with stepped rows of v-grooves inside the ferrule, each groove row functioning to guide and to accommodate a ribbon. Usually, one installs the bottom most ribbon first, where the v-grooves are the longest by aligning the fibers of the ribbon in the guiding v-grooves and then pushing the fibers into the connected fiber holes. One then installs a second ribbon in a second row of v-grooves that is slightly shorter than the first row. Because most ferrules have an opening on the top, the installer is able to visually see the ribbons entering each row of v-grooves. Such a process can be very time consuming and can produce low yield. Thus, there is a need in the art for different ferrule designs that allow for easy and efficient installation of optical fibers, whether the optical fibers are in the form of multiple ribbons or in the form of a plurality of single optical fibers.

SUMMARY

The present invention provides for a ferrule designed to allow for simultaneous installation of multiple fiber optic ribbons in an efficient and timely manner. The present invention is also useful for simultaneous installation of single optical fibers lying substantially parallel to one another. As used herein a "single optical fiber" is one that has a glass core surrounded by a glass cladding, which is surrounded by a polymeric coating. That is, a single optical fiber differs from a fiber optic ribbon in that the former does not contain any polymeric matrix to hold the single optical fibers together. As used herein, the term "coincide" means generally that the items occupy the same place in space but they doe not have to have exactly the same dimensions.

In one aspect, the invention further provides an apparatus that can be used with the inventive ferrule to enhance success of installing the ribbons into the ferrule. By enhancing success, it is meant generally that the amount of time needed to install the ribbons is minimized, and the yield, i.e., the rate at which the ribbons and their associated exposed optical fibers are properly installed is increased when compared to manual installations without using the guiding apparatus and the inventive ferrule. As used herein, the term "exposed optical fibers" means that the polymeric matrix and the polymeric coating has been removed from the ribbon thereby exposing the cladding.

In another aspect, the present invention pertains to a ferrule for use in a fiber optic connector. The ferrule has front and rear faces. The ferrule comprises (a) a passage being disposed inside the ferrule and having first and second ends, the passage having dimensions defined by the following formulas:

$$(n*a) \leq H \leq (n+1)*a$$

$$X \leq W \leq X+b$$

where "W" is the passage width, "H" is the passage height, "X" is the measured width of the fiber optic ribbon, "n" is the number of optical fiber ribbons and n>1, "a" is the fiber optic ribbon thickness and "b" is the fiber pitch; and (b) a plurality of rows of fiber channels disposed between the second end of the passage to the front face. The positioning of the fiber channels and the positioning of the rows of fiber channels coincide with the fiber pitch and ribbon thickness, respectively, of the fiber optic ribbon. The length of the passage is longer than the length of the fiber channels.

In yet another aspect, the present invention pertains to a method of mounting at least two optical fiber ribbons into a ferrule in an optical fiber connector. The method comprises the steps of:

(a) providing at least two optical fiber ribbons stacked on top of each other, a portion of each optical fiber ribbon having exposed optical fibers;

(b) providing a ferrule having front and rear faces and comprising: (i) a passage being disposed inside the ferrule and having first and second ends, the passage having dimensions defined by the following formulas:

$$(n*a) \leq H \leq (n+1)*a$$

$$X \leq W \leq X+b$$

where "W" is the passage width, "H" is the passage height, "X" is the measured width of the fiber optic ribbon, "n" is the number of fiber optic ribbons and n>1, "a" is the fiber optic ribbon thickness and "b" is the fiber pitch; and (ii) a plurality of rows of fiber channels disposed between the second end of the passage and the front face of the ferrule; where the positioning of the fiber channels and the positioning of the rows of fiber channels coincide with the fiber pitch and ribbon thickness respectively and where the length of the passage is longer than the length of the fiber channels;

(c) guiding the fiber optic ribbons into the rear face of the ferrule such that the exposed optical fibers reside in the fiber channels;

(d) securing the fiber optic ribbons in the ferrule; and (e) polishing the front face such that the exposed optical fibers are substantially flush with the front face of the ferrule.

In yet another aspect, the present invention relates to a guiding apparatus that can be used in conjunction with the inventive ferrule to aid in the installation of the fiber optic ribbons.

The above summary of the present invention is not intended to describe each disclosed embodiment or every implementation of the present invention. The figures and detailed description that follow below more particularly exemplify illustrative embodiments.

BRIEF DESCRIPTION OF THE DRAWINGS

The invention can be further described with the figures below, wherein.

These figures are idealized, not drawn to scale and are intended only for illustrative purposes.

DETAILED DESCRIPTION

Most commercially available fiber optic ribbons contain a plurality of optical fibers that serve as the communication channels. While various fiber optic ribbons, e.g., 2-fiber, 4-fiber, 8-fiber, etc. are available, most are in the range of only a few millimeters in width. For example, an 8-fiber ribbon commercially available from Corning Cable Systems, LLC is on the order of 2 mm wide. Because of the relatively small and rather delicate nature of the fiber optic ribbon, it can be time consuming to install or mount the ribbons in the ferrules. An advantage of one exemplary embodiment of the present invention is that through the design of the ferrule, one can quickly and easily install a plurality of fiber optic ribbons. In this document, all numbers are assumed to be modified by the term "about".

Figure 1:
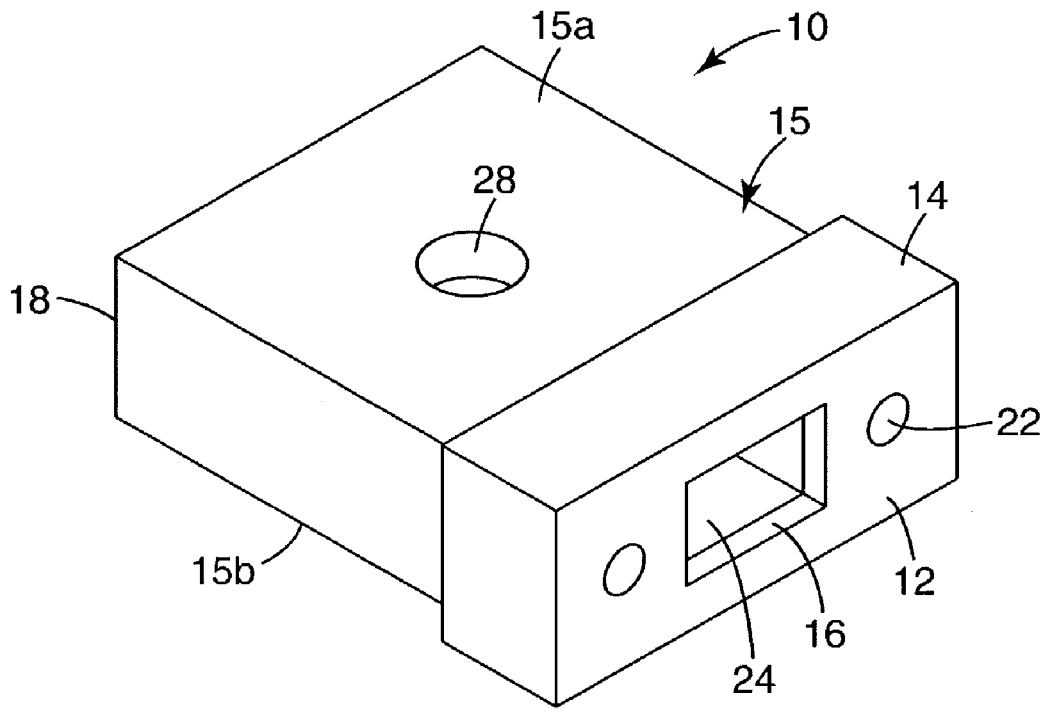
FIG. 1 is an isometric view of one exemplary embodiment of a ferrule in accordance with one aspect of the present invention.

FIG. 1 is an isometric view of one exemplary embodiment of ferrule 10 having rear face 12, front face 18, and passage 24. Optional features of this particular embodiment include, tapered entrance 16 on one end of the passage that meets rear face 12, guide pin channel 22 and window 28 on top side 15a of the ferrule. Although this particular embodiment shows the window on topside 15a, the window could be on bottom side 15b if desired. The ferrule has a first portion 14, second portion 15 and step 17 (FIG. 4).

Figure 2:
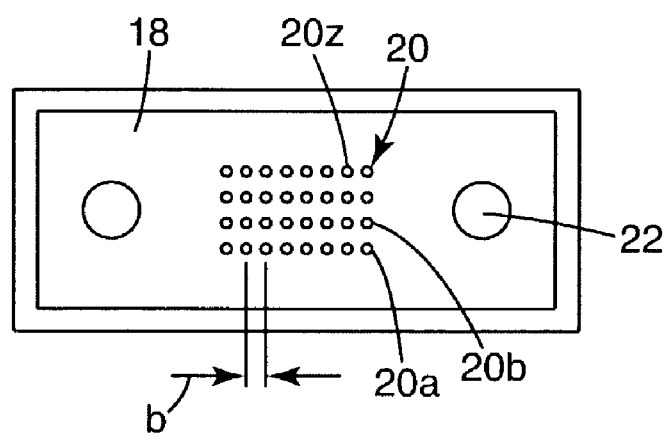
FIG. 2 is a front-end view of the embodiment in FIG. 1.

FIG. 2 is an end view of the front face of the ferrule showing a plurality of holes 20 where exposed optical fibers (not shown) from fiber optic ribbons would eventually reside. As better shown in FIG. 4, the holes are the exiting ends of a plurality of fiber channels 26, in particular portion 26c of the fiber channels. In one exemplary embodiment, the number of holes coincide with the number of optical fibers used. In the embodiment shown in FIG. 2, 32 holes are shown to accommodate four 8-fiber ribbons. Each ribbon would occupy a row of holes, such as row 20a or row 20b. In this description, a row lies horizontal to the page while a column lies vertical to the page, such as column 20z. And, the terms row and column are used merely for the purposes of describing relative orientations.

Figure 3:
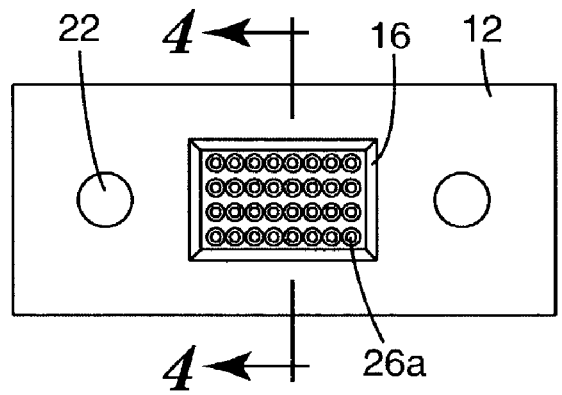
FIG. 3 is a rear-end view of the embodiment in FIG. 1.

FIG. 3 is an end view of the rear face of the ferrule showing the ends of first portion 26a of the fiber channels. As in the case with FIG. 2, 32 fiber channels are provided to accommodate at most four 8-fiber ribbons. Although 32 openings are shown, one skilled in the art will appreciate that any other number of openings can be used in the present invention. For example, 24 openings can be used to accommodate two 12-fiber ribbon or three 8-fiber ribbons or four 6-fiber ribbons, or six 4-fiber ribbons or eight 3-fiber ribbons or twelve 2-fiber ribbons, should the 3-fiber and 6-fiber ribbons be available. The fiber pitch, i.e., the distance between each individual optical fibers, is denoted as "b" in FIG. 2.

Figure 4:
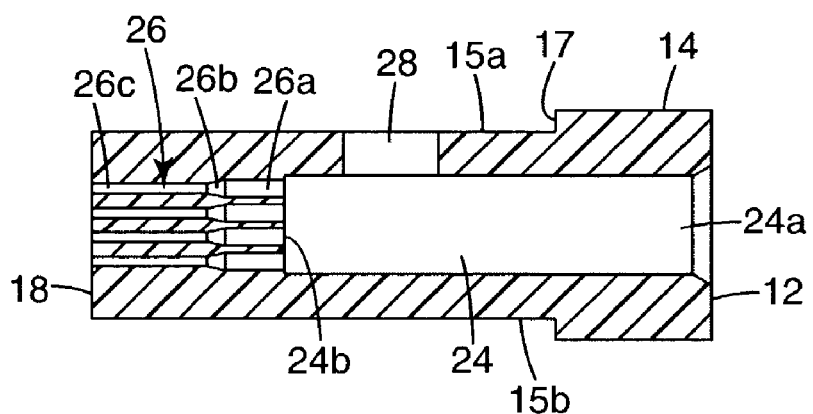
FIG. 4 is a cross-sectional view of the embodiment in FIG. 1.

FIG. 4 shows a cross-sectional view of an exemplary embodiment of the present invention. Passage 24 resides within the ferrule and has first end 24a and second end 24b. In this particular embodiment the first end of the passage has tapered entrance 16 that meets rear face 12. Fiber channels 26 also reside within the ferrule and are disposed between second end 24b of the passage to front face 18 of the ferrule. Although first end 24a and second end 24b are shown to be substantially vertical, it is within the scope of the present invention to use non-vertical ends. For example, second end 24b of the passage could be at an angle such that the bottom-most row of fiber channels is longer than the top most row. In this particular embodiment, the fiber channel contains a first region 26a, second region 26b that is a transition region, and third region 26c. First and third regions have substantially constant diameters with the diameter of the first region being larger than the diameter of the third region.

As stated, window 28 is optional and resides on one side, here shown as the topside, of the ferrule. In this exemplary embodiment the window is disposed over a portion of the passage and not over the fiber channels. It has been found that positioning the window away from the fiber channels or away from the entrance of the fiber channels reduces, if not prevent, breakage of the exposed optical fibers as they enter into the fiber channels. The window is also smaller in area than the window currently used on a conventional MT ferrule. In this particular embodiment, if the distance between front face 18 and rear face 12 of the ferrule is 8±0.1 mm, the window diameter is 1.25±0.1 mm.

The passage is substantially constant in its cross-section. It has dimensions defined by the following formulas:

$$(n*a) \leq H \leq (n+1)*a$$

$$X \leq W \leq X+b$$

where "W" is the passage width, "H" is the passage height, "X" is the measured width of the fiber optic ribbon, "n" is the number of fiber optic ribbons and n>1, "a" is the fiber optic ribbon thickness and "b" is the fiber pitch. These formulas recite the minimum and maximum dimensions for the passage width and height.

In use, when installing a plurality of fiber optic ribbons into the ferrule, the passage dimensions function to guide the ribbons. The ribbons occupy substantially all of the space in the passage. Tapered entrance 16 of the passage if used, provides visual aid and alignment to the installer during the initial insertion of the ribbons. The spacing between each fiber channel 26 coincide with the fiber pitch on the ribbon. Furthermore, the spacing between the rows of fiber channels coincide with the ribbon thickness. Third regions 26c function as a guide for the incoming exposed optical fibers.

Figure 5:
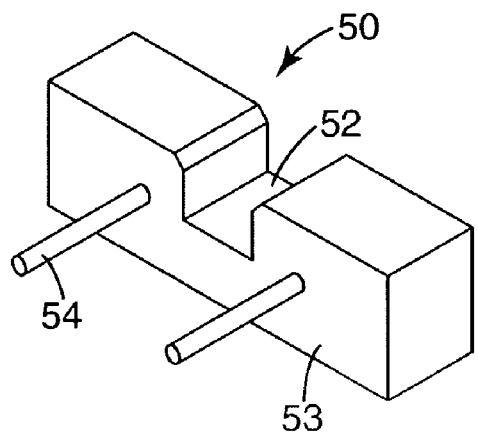
FIG. 5 is an isometric view of one exemplary embodiment of a guiding apparatus, in accordance with another aspect of the present invention.

FIG. 5 shows an isometric view of an apparatus 50 that can be used to help guide fiber optic ribbons into the ferrule. The apparatus has groove 52 to hold a plurality of fiber optic ribbons that have been stacked on top of each other and two guiding pins 54 extend from a first surface 53. The apparatus can also be used with a single fiber optic ribbon. Groove 52 has been precisely formed to a dimension corresponding to the width of the fiber optic ribbon. If desired, one could use a complementary cover or top plate (not shown) having a protrusion or step that mates with groove 52. In use, the apparatus contains a plurality of fiber optic ribbon stacked on top of one another to form a bundle of ribbons. A portion of one end of each ribbon has been stripped of the ribbon matrix and the protective polymer coating yielding exposed optical fibers. The apparatus with ribbons is engaged into the rear face of the ferrule such that the guiding pins on the apparatus mates with the guide pin channels. Once mated, a user can grasp the bundle of fiber optic ribbons and feed it toward the ferrule. Alternatively, the user can install the complementary top plate so that the bundle of fiber optic ribbons is sandwiched between groove 52 and the protrusion on the top plate. Because of the compatibility in the design of the guiding apparatus and of the ferrule, the bundle of fiber optic ribbon enter the passage and the exposed optical fiber are guided into the fiber channel. The guiding apparatus can be made from a smooth material, such as a metal.

Once fiber optic ribbons are engaged in the passage and the exposed optical fibers are mounted in the fiber channel, a polymeric binder is fed into the window on the ferrule. The polymeric binder is then allowed to cure thereby securing the individual exposed optical fibers in the fiber channels. Typically, a portion of the individual exposed optical fiber will protrude from the front face of the ferrule. Because one ferrule mates with another ferrule at the front face so that the optical fibers can provide a continuous medium for the light to travel, it is common to polish the front face after the fiber optic ribbons are installed and the polymeric binder has cured. After polishing, the front face of the ferrule and the exposed optical fibers residing in the fiber channels will be substantially flush. In some applications, it may be desirable to polish the front face of the ferrule so as to allow for a controlled amount of optical fiber protruding from the front face. Any polymeric binder having a glass transition temperature ($T_g$) greater than 60° C. can be used in the present invention. Particularly suited polymeric binder has a $T_g$ greater than 70° C. Suitable polymeric binders include epoxy, acrylates, and cyanoacrylates.

Besides fiber optic ribbons, it is within the scope of the present invention to use single optical fibers. For example, a plurality of single optical fibers can be placed in groove fiber optic 52 of the apparatus so that the fibers lie parallel to one another to form a first row of single optical fibers. A second row of single optical fibers are formed on the first row. These rows of single optical fibers are then fed towards the ferrule, similar to that of multiple rows of fiber optic ribbons.

One skilled in the art will recognize that there are various ways to manufacture the inventive ferrule. For example, the ferrule can be made using highly filled glass held together by epoxy. In another method, the ferrule can be made using injection molding technology using injection molded polymers containing fillers.

What is claimed is:

1. A ferrule apparatus comprising a ferrule and fiber loading apparatus for use in an fiber optic connector, said ferrule having front and rear faces and comprising:
   a passage being disposed inside said ferrule and having first and second ends, said passage having dimensions defined by the following formulas:

$(n*a) \leq H \leq (n+1)*a$ $X \leq W \leq X+b$ where "W" is the passage width, "H" is the passage height, "X" is the measured width of a fiber optic ribbon, "n" is the number of fiber optic ribbons and n>1, "a" is the fiber optic ribbon thickness and "b" is the fiber pitch;
   a plurality of rows of fiber channels disposed between said second end of said passage to said front face of said ferrule; wherein the position of said fiber channels and the positioning of said rows of fiber channels coincide with the fiber pitch and ribbon thickness respectively; and wherein the length of said passage is longer than the length of said fiber channel;
   a guide-pin channel disposed parallel to said passage and running from said rear face to said front face of said ferrule: and
   the fiber loading apparatus comprising a groove to hold a plurality of fiber optic ribbons that have been stacked on top of each other and a guiding pin extending from a first surface of the fiber loading apparatus and mateable with the guide pin channel, wherein the groove has a width corresponding to a width of a fiber optic ribbon.

2. The ferrule apparatus of claim 1 further comprising a fiber optic ribbon, said ribbon having a plurality of exposed optical fibers.

3. The ferrule apparatus of claim 2, where in at least a portion of said fiber optic ribbon reside in said passage and wherein said exposed optical fibers reside in said fiber channels.

4. The ferrule apparatus of claim 3, wherein at least a portion of said fiber optic ribbon is secured to said passage and said exposed optical fibers are secured to said fiber channels with a polymeric binder.

5. The ferrule apparatus of claim 4, wherein said polymeric binder is selected from the group consisting of epoxy, acrylates, and cyanoacrylates.

6. The ferrule apparatus of claim 3 wherein said fiber optic ribbons are stacked on top of one another when residing in said passage.

7. The ferrule apparatus of claim 1 further comprising a window on its top side.

8. The ferrule apparatus of claim 7, wherein said window is disposed over a portion of said passage.

9. The ferrule apparatus of claim 1, wherein said fiber channels have a first concentric section that is in contact with the second end of said passage and a second concentric section that is in contact with said front face, said first concentric section being larger in diameter than said second concentric section.

10. The ferrule apparatus of claim 1, wherein said first end of said passage has a tapered entrance that meet said rear face of said ferrule.

11. A method of mounting at least two fiber optic ribbons into a ferrule in fiber optic connector, said method comprising the steps of:
  (a) providing at least two fiber optic ribbons stacked on top of each other, a portion of each fiber optic ribbon having exposed optical fibers;
  (b) providing a ferrule having front and rear faces and comprising:
    (i) a passage being disposed inside said ferrule and having first and second ends, said passage having dimensions defined by the following formulas:

$(n*a) \leq H \leq (n+1)*a$ $X \leq W \leq X+b$ where "W" is the passage width, "H" is the passage height, "X" is the measured width of the fiber optic ribbon, "n" is the number of optical fiber ribbons and n>1, "a" is the optical fiber ribbon thickness and "b" is the fiber pitch;
    (ii) a plurality of fiber channels disposed between said second end of said passage and said front face wherein the positioning of said fiber channels and the positioning of said rows of fiber channels coincide with the fiber pitch and ribbon thickness respectively; and wherein the length of said passage is longer than the length of said fiber channels, wherein the ferrule further comprises a guide pin channel disposed parallel to said passage and running from said rear face to said front face of said ferrule;
  (c) guiding said fiber optic ribbons into said rear face of said ferrule such that said exposed optical fibers reside in said fiber channels and at least a portion of said fiber optic ribbon resides in said passage, wherein the fiber optic ribbons are loaded in the ferrule with a fiber loading apparatus comprising a groove to hold a plurality of fiber optic ribbons that have been stacked on top of each other and a guiding pin extending from a first surface of the fiber loading apparatus and mateable with a guide pin channel formed in the ferrule, wherein the groove has a width corresponding to a width of a fiber optic ribbon;
  (d) securing said exposed optical fibers and fiber optic ribbons in said ferrule; and
  (e) polishing said front face of said ferrule.

12. The method of claim 11, wherein said ferrule further comprises a window on its top surface.

13. The method of claim 12, wherein said window is disposed over a portion of said passage.

14. The method of claim 13, wherein a polymer binder is used in said securing step is a polymeric binder.

15. The method of claim 14, wherein said polymeric binder is supplied to said ferrule via said window.

16. The method of claim 14, wherein said polymeric binder is selected from the group consisting of epoxy, acrylate, and cyanoacrylates.

17. The method of claim 11, wherein said polishing step is such that the exposed optical fibers are approximately flush with said front face of said ferrule.

* * * * *